US009250442B2

(12) United States Patent  
Cho et al.

(10) Patent No.: US 9,250,442 B2
(45) Date of Patent: Feb. 2, 2016

(54) HEAD MOUNTED DISPLAY DEVICE INCLUDING MULTIPLE USER INTERFACE FORMATS AND METHOD OF CONTROLLING THEREFOR

(71) Applicant: LG ELECTRONICS INC., Seoul (KR)

(72) Inventors: Eunhyung Cho, Seoul (KR); Sinae Chun, Seoul (KR); Jongho Kim, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 13/964,655

(22) Filed: Aug. 12, 2013

(65) Prior Publication Data

US 2015/0015458 A1 Jan. 15, 2015

(30) Foreign Application Priority Data

Jul. 10, 2013 (KR) .......................... 10-2013-0081137

(51) Int. Cl.
*G02B 27/01* (2006.01)

(52) U.S. Cl.
CPC ........ *G02B 27/017* (2013.01); *G02B 2027/014* (2013.01); *G02B 2027/0118* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| 8,411,907 | B2* | 4/2013 | Nelson et al. ................. 382/115 |
| 2009/0243966 | A1* | 10/2009 | Kato et al. ........................ 345/8 |
| 2010/0182404 | A1* | 7/2010 | Kuno .............................. 348/43 |
| 2010/0283711 | A1 | 11/2010 | Sadler |
| 2011/0096154 | A1* | 4/2011 | Nam et al. ....................... 348/53 |
| 2011/0316847 | A1* | 12/2011 | Cheng ........................... 345/419 |
| 2012/0133884 | A1 | 5/2012 | Ishida |
| 2012/0299870 | A1 | 11/2012 | Chi et al. |
| 2014/0225915 | A1* | 8/2014 | Theimer et al. ............... 345/633 |

FOREIGN PATENT DOCUMENTS

| EP | 1406176 A1 | 4/2004 |
| KR | 20-0120590 Y1 | 8/1998 |

* cited by examiner

*Primary Examiner* — Joseph Haley
*Assistant Examiner* — Emily Frank
(74) *Attorney, Agent, or Firm* — Birch, Stewart, Kolasch & Birch, LLP

(57) ABSTRACT

A method of controlling a head mounted display (HMD) device according to one embodiment of the present specification includes the steps of detecting whether the head mounted display device is in a wearing mode or a non-wearing mode, if the head mounted display device is in the wearing mode, displaying the digital information with a first user interface format, and if the head mounted display device is in the non-wearing mode, displaying the digital information with a second user interface format, wherein the digital information displayed with the second user interface format corresponds to the digital information displayed in a manner of expanding the digital information displayed with the first user interface format.

20 Claims, 7 Drawing Sheets

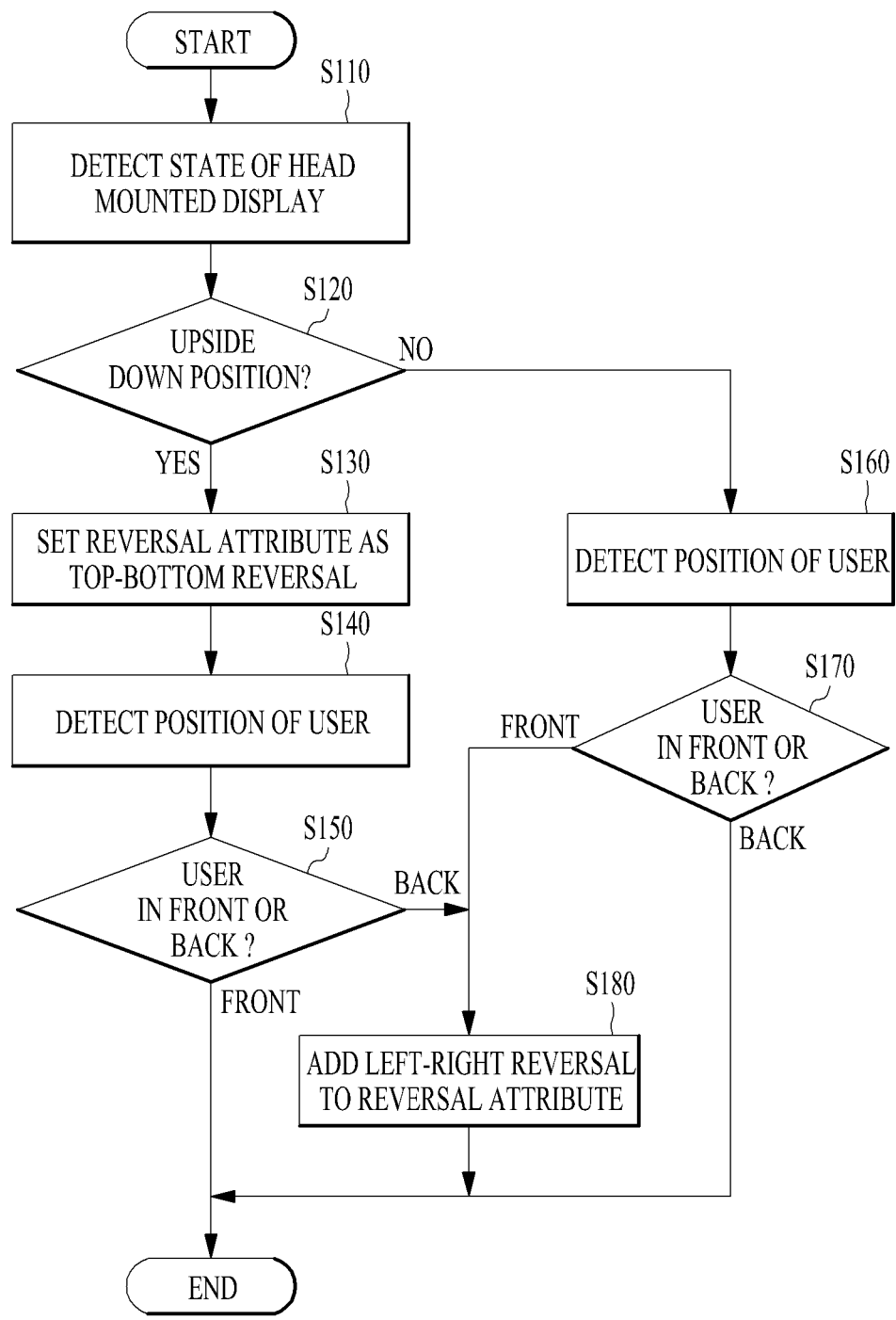

HEAD MOUNTED DISPLAY DEVICE INCLUDING MULTIPLE USER INTERFACE FORMATS AND METHOD OF CONTROLLING THEREFOR

Pursuant to 35 U.S.C. §119(a), this application claims the benefit of the Korean Patent Application No. 10-2013-0081137, filed on Jul. 10, 2013, which is hereby incorporated by reference as if fully set forth herein.

BACKGROUND OF THE INVENTION

1. Field of the Invention

The present specification relates to a head mounted display device, and more particularly, to a head mounted display device displaying digital information with a user interface format different from each other according to whether a user wears the head mounted display device or not.

2. Discussion of the Related Art

As a head mounted display device has been lightened, users can watch digital information in a manner of wearing the head mounted display device like glasses. A display unit of the head mounted display device is located at a position close to eyes of a user. Hence, the head mounted display device should display digital information in a small size to enable the user to watch the digital information, which is displayed or projected. Because of the aforementioned characteristic of the head mounted display device, if the user takes off the head mounted display device, the user cannot watch the digital information provided by the head mounted display device. Hence, a method of providing the digital information to the user is required while the head mounted display device is in a state of being taken off.

SUMMARY OF THE INVENTION

Accordingly, the present specification is directed to an apparatus and method thereof that substantially obviate one or more problems due to limitations and disadvantages of the related art.

An object of the present specification is to provide a head mounted display device changing a user interface format according to whether a user wears the head mounted display device and a method of controlling therefor. In particular, in the present specification, it is necessary to provide a method of determining which user interface format can be used for the head mounted display device displaying digital information, which are displayed according to whether a user wears the head mounted display device and according to a state on which the head mounted display device is put.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head mounted display (HMD) device according to one embodiment of the present specification includes a display unit configured to display digital information according to a user interface format, a sensor unit configured to detect whether the head mounted display device is in a wearing mode or a non-wearing mode, and a controller configured to control the display unit and the sensor unit, if the head mounted display device is in the wearing mode, the controller configured to display the digital information with a first user interface format, if the head mounted display device is in the non-wearing mode, the controller configured to display the digital information with a second user interface format.

To achieve these and other advantages and in accordance with the purpose of the present specification, as embodied and broadly described, according to one embodiment, a method of controlling a head mounted display (HMD) device includes the steps of detecting whether the head mounted display device is in a wearing mode or a non-wearing mode, if the head mounted display device is in the wearing mode, displaying the digital information with a first user interface format, and if the head mounted display device is in the non-wearing mode, displaying the digital information with a second user interface format, wherein the digital information displayed with the second user interface format corresponds to the digital information displayed in a manner of expanding the digital information displayed with the first user interface format.

According to the present specification, a head mounted display device can apply a user interface format different from each other to digital information according to whether a user wears the head mounted display device.

According to the present specification, if a head mounted display device is not wore, the head mounted display device can display digital information in a manner of reversing a top-bottom of the digital information according to a state on which the head mounted display device is put.

According to the present specification, a head mounted display device can display digital information in a manner of reversing a left-right of the digital information according to a position of a user.

According to the present specification, a head mounted display device can project digital information to an external object.

According to the present specification, a head mounted display device can control a magnification to expand digital information according to a distance between a user and the head mounted display device.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a flowchart of a method of determining a reversal attribute of a second user interface format according to one embodiment of the present specification.

DETAILED DESCRIPTION OF THE INVENTION

While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

A head mounted display device may include a wearable device capable of displaying visual information in a manner of being worn on a body of a user in the present specification. And, digital information may include digital information, a graphic user interface, or a notification in the present specification.

Figure 1:
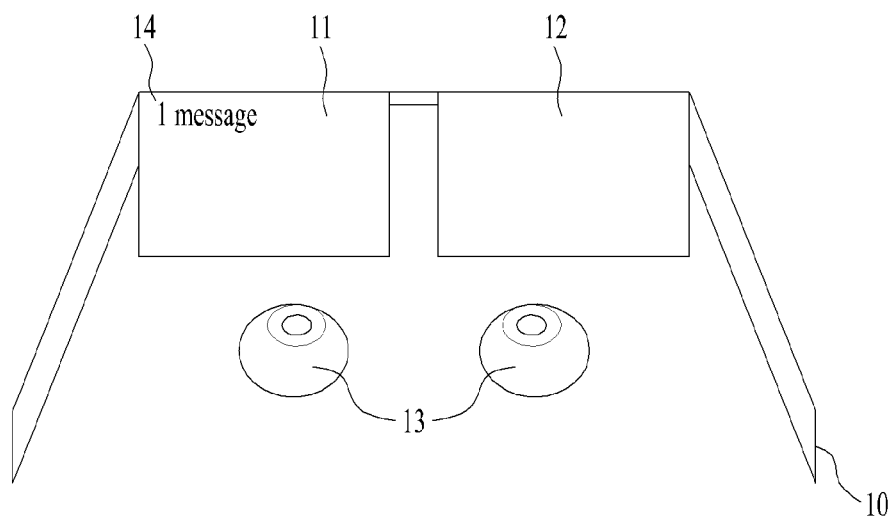
FIG. 1 is a diagram of a wearing mode of a head mounted display device according to one embodiment of the present specification.
Figure 1:
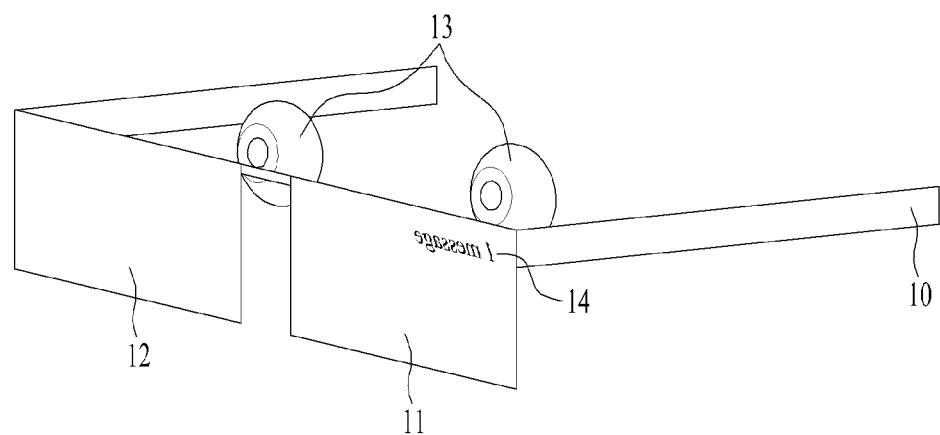

FIG. 1 is a diagram of a wearing mode of a head mounted display device according to one embodiment of the present specification. The top of FIG. 1 depicts an inside of the head mounted display device 10. The head mounted display device 10 can include a display unit 11/12. The display unit 11/12 can be positioned at the front of a left eye or a right eye of a user according to an embodiment or can be positioned at the front of both eyes of the user according to a different embodiment. If the display unit is positioned at the both eyes of the user, the head mounted display device 10 may provide a 3-dimensional image to the user using a binocular disparity.

If a user wears a head mounted display device, the head mounted display device 10 can display digital information in the display unit and can deliver the displayed digital information to eyes 13 of the user. The head mounted display device 10 can display the digital information in response to a user interface format. The user interface format can include a magnification attribute of the digital information 14, a character attribute, a form attribute, and a reversal attribute. The magnification attribute defines a magnification of the digital information 14 and the character attribute can define a size or a font of a character included in the digital information 14. And, the form attribute can include a detail version and a simple version of the digital information 14. The detail version can include all elements included in the digital information as an object to be displayed. The simple version can include a part of the elements selected according to a priority among the elements included in the digital information as an object to be displayed. In this case, the priority can be determined according to the importance or the urgency of the element included in the digital information. The reversal attribute can include a left-right reverse, a top-bottom reverse, or a top-bottom left-right reverse for the digital information 14.

Since the display unit 11/12 is located at a position close to the eyes 13 of the user, the head mounted display device 10 can display the digital information 14 with a low magnification. In particular, if a highest magnification of digital information capable of being recognized by the eyes 13 of the user wearing the head mounted display device 10 corresponds to a first magnification threshold, the head mounted display device 10 can display the digital information with a magnification lower than the first magnification threshold.

The head mounted display device 10 in a wearing mode can display the digital information 14 with a first user interface format. The head mounted display device 10 can set a value lower than the first magnification threshold capable of being recognized by the neighboring eyes 13 of the user as a magnification attribute of the first user interface format. And, the head mounted display device 10 can set a value smaller than a first size threshold capable of being recognized by the neighboring eyes 13 of the user as a character attribute of the first user interface format. In particular, a size of the characters included in the digital information can be set as a value smaller than the first size threshold.

And, the head mounted display device 10 can set a font capable of being easily recognized by the neighboring eyes 13 of the user as the character attribute of the first user interface format. The head mounted display device 10 can set a detail version as a form attribute of the first user interface format. The detail version can include all elements included in the digital information as an object to be displayed. And, the head mounted display device 10 can set a reversal attribute of the first user interface format not to be reversed in top-bottom and left-right.

The bottom of FIG. 1 depicts the outside of the head mounted display device 10. In case of watching the outside of the head mounted display device 10, the digital information 14 displayed in the display unit 11 can be seen as a state that the left and the right of the digital information are reversed. In particular, in case that the digital information 14 displayed in the display unit 11 is seen not by the user wearing the head mounted display device but by a different user, the digital information 14 can be seen as a state that the left and the right of the digital information are reversed like the digital information reflected in a mirror by the different user. Hence, if it is necessary to show the digital information 14 to not the user wearing the head mounted display device 10 but the different user, the head mounted display device 10 can display the digital information 14 in a manner of reversing the left and the right of the digital information. By doing so, the user not wearing the head mounted display device 10 can check the digital information 14 displayed in the display unit 11 as well. In the following description, in case that the head mounted display device 10 is in a non-wearing mode, a method of setting a reversal attribute to provide digital information to the user is explained.

Figure 2:
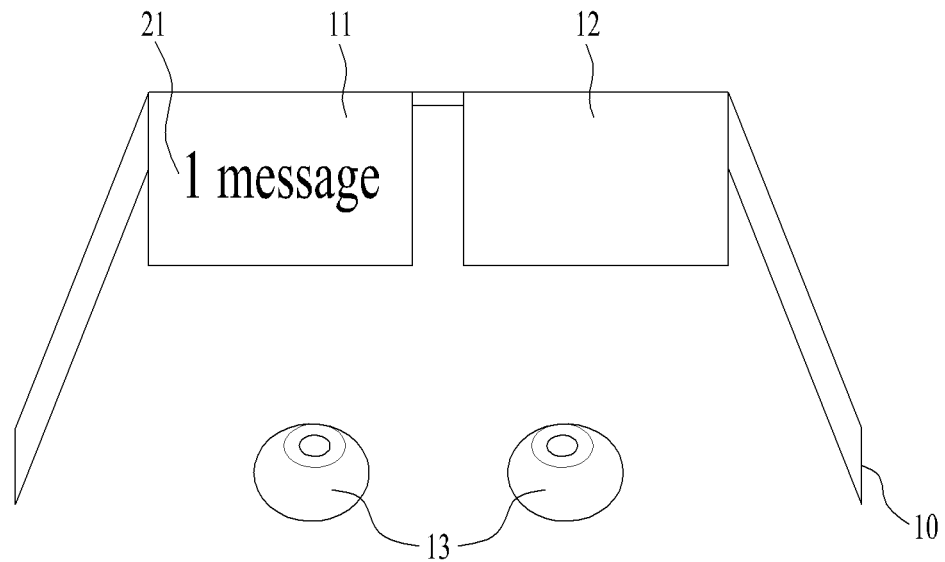
FIG. 2 is a diagram of a non-wearing mode of a head mounted display device according to one embodiment of the present specification.
Figure 2:
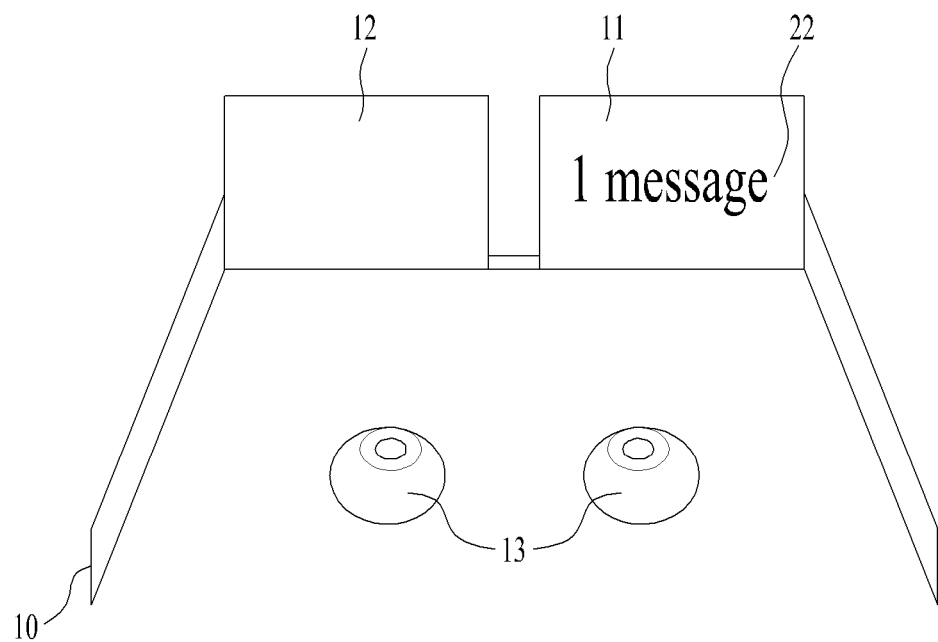

FIG. 2 is a diagram of a non-wearing mode of a head mounted display device according to one embodiment of the present specification. A user taken off the head mounted display device can gaze at the display unit of the head mounted display device, which is in a non-wearing mode.

In the top of FIG. 2, the head mounted display device 10 can display digital information 21 with a second user interface format in a non-wearing mode. The head mounted display device 10 can set a value higher than a second magnification threshold as a magnification attribute of a second user interface format. In this case, the second magnification threshold can be defined as a magnification capable of recognizing the digital information 21 by eyes 13 of a user positioned at a point apart from the head mounted display device 10 more than a predetermined distance. The second magnification threshold can be determined according to the information of eyesight of the user. In particular, the head mounted display device 10 can display the digital information displayed with the first user interface format in the wearing mode in a manner of expanding the digital information with the second user interface format in the non-wearing mode. By doing so, the user can check the digital information 21 displayed in the display unit 11 in a manner of being expanded by a vision even in the state that the user does not wear the head mounted display device 10.

And, the head mounted display device can set a value bigger than a second size threshold, which is capable of being recognized by the eyes 13 of the user positioned at a point apart from the head mounted display device more than a predetermined distance, as a character attribute of the second user interface. In particular, a size of characters included in the digital information can be expanded to the value bigger than the second size threshold. And, in order for the eyes 13 of the user positioned at a point apart from the head mounted display device more than a predetermined distance to easily recognize, the head mounted display device 10 can set a font of high visibility as the character attribute of the second user interface format. The head mounted display device 10 can set a simple version as a form attribute of the second user interface format. The simple version can include a part of the elements selected according to a priority among the elements included in the digital information as an object to be displayed. In this case, the priority can be determined according to the importance or the urgency of the element included in the digital information.

The head mounted display device 10 can detect a position of a user in the non-wearing mode. If the head mounted display device is put on a different object in the non-wearing mode, the head mounted display device can detect whether the head mounted display device 10 is upside down.

The head mounted display device 10 in the non-wearing mode can determine a reversal attribute of the second user interface format according to the detected position of the user and the state on which the head mounted display device is put. As depicted in the top of FIG. 2, if the user is positioned at the back of the head mounted display device 10 and the head mounted display device 10 is put without being upside down, the head mounted display device can set the reversal attribute of the second user interface format not to be reversed in top-bottom and left-right. By doing so, the user positioned at the back of the head mounted display device 10 can check the digital information 22 not reversed or not rotated with a vision.

The bottom of FIG. 2 depicts a state that the head mounted display device 10 is in an upside down position. The head mounted display device 10 of the bottom of FIG. 2 can display digital information 22 with a second user interface format. The second user interface format of the bottom of FIG. 2 where the head mounted display device is in an upside down position may include the magnification attribute, the character attribute, and the form attribute identical to those of the second user interface format of the top of FIG. 2. Yet, the reversal attribute may be different from each other in the top and the bottom of FIG. 2, respectively.

As depicted in the bottom of FIG. 2, if the user is positioned at the back of the head mounted display device 10 and the head mounted display device 10 is in an upside down position, the head mounted display device 10 can set the reversal attribute of the second user interface format as a top-bottom and a left-right reversal. In this case, the reversal attribute of the second user interface format can be defined by a reference of the digital information displayed with the first user interface format. In particular, if the reversal attribute of the second user interface format corresponds to a left-right reversal, the digital information of the second user interface format may correspond to the digital information reversed the left and the right of the digital information of the first user interface.

And, the head mounted display device 10 can apply a rotation attribute rotating as much as 180 degrees to the second user interface format instead of the reversal attribute of the second user interface format according to embodiment. By doing so, the user positioned at the back of the head mounted display device 10 can check the digital information 22, which is not reversed or rotated, by a vision.

Figure 3:
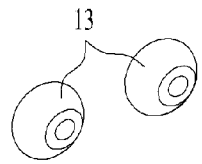
FIG. 3 is a diagram of a non-wearing mode of a head mounted display device according to a different embodiment of the present specification.
Figure 3:
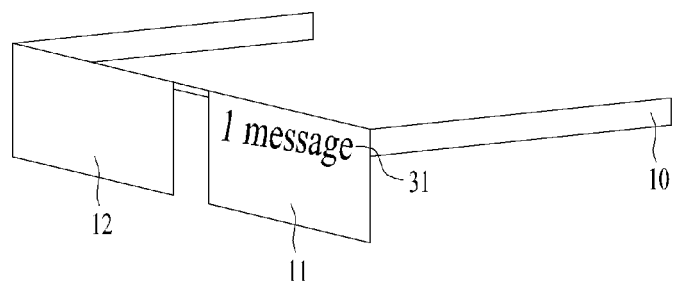
Figure 3:
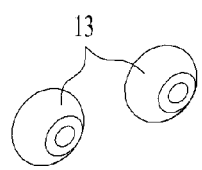
Figure 3:
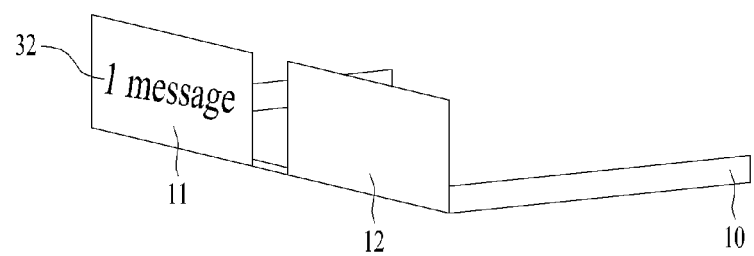

FIG. 3 is a diagram of a non-wearing mode of a head mounted display device according to a different embodiment of the present specification. A user taken off the head mounted display device can gaze at the display unit of the head mounted display device in the non-wearing mode.

In the top of FIG. 3, the head mounted display device 10 can display digital information 31 with a second user interface format in the non-wearing mode. The head mounted display device 10 can set a value higher than a second magnification threshold as a magnification attribute of a second user interface format. In this case, the second magnification threshold can be defined as a magnification capable of recognizing the digital information 31 by eyes 13 of a user positioned at a point apart from the head mounted display device 10 more than a predetermined distance. The second magnification threshold can be determined according to the information of eyesight of the user. In particular, the head mounted display device 10 can display the digital information, which was displayed with the first user interface format in the wearing mode, in a manner of expanding the digital information with the second user interface format in the non-wearing mode. By doing so, the user can check the digital information 31 displayed in the display unit 11 in a manner of being expanded by a vision even in the state that the user does not wear the head mounted display device 10.

And, the head mounted display device can set a value bigger than a second size threshold, which is capable of being recognized by the eyes 13 of the user positioned at a point apart from the head mounted display device more than a predetermined distance, as a character attribute of the second user interface. In particular, a size of characters included in the digital information can be expanded to the value bigger than the second size threshold.

And, in order for the eyes 13 of the user positioned at a point apart from the head mounted display device more than a predetermined distance to easily recognize, the head mounted display device 10 can set a font of high visibility as the character attribute of the second user interface format. The head mounted display device 10 can set a simple version as a form attribute of the second user interface format. The simple version can include a part of the elements selected according to a priority among the elements included in the digital information as an object to be displayed. In this case, the priority can be determined according to the importance or the urgency of the element included in the digital information.

The head mounted display device 10 can detect a position of a user in the non-wearing mode. If the head mounted display device is put on a different object in the non-wearing mode, the head mounted display device can detect whether the head mounted display device 10 is upside down.

The head mounted display device 10 in the non-wearing mode can determine a reversal attribute of the second user interface format according to the detected position of the user and the state of which the head mounted display device is put. As depicted in the top of FIG. 3, if the user is positioned at the front of the head mounted display device 10 and the head mounted display device 10 is put without being upside down, the head mounted display device can set the reversal attribute of the second user interface format to be reversed in left-right without being reversed in top-bottom. In this case, the reversal attribute of the second user interface format can be defined by a reference of the digital information displayed with the first user interface format. In particular, if the reversal attribute of the second user interface format corresponds to a left-right reversal, the digital information of the second user interface format can be obtained by reversing the left and the right of the digital information displayed with the first user interface format. By doing so, the user positioned at the front of the head mounted display device 10 can check the digital information 31, which is not reversed or not rotated, with a vision.

The bottom of FIG. 3 depicts a state that the head mounted display device 10 is in an upside down position. The head mounted display device 10 of the bottom of FIG. 3 can display digital information 32 with a second user interface format. The second user interface format of the bottom of FIG. 3 where the head mounted display device 10 is in an upside down position may include the magnification attribute, the character attribute, and the form attribute identical to those of the second user interface format of the top of FIG. 3. Yet, the reversal attribute may be different from each other in the top and the bottom of FIG. 3, respectively.

As depicted in the bottom of FIG. 3, if the user is positioned at the front of the head mounted display device 10 and the head mounted display device 10 is in an upside down position, the head mounted display device 10 can set the reversal attribute of the second user interface format as a top-bottom reversal. By doing so, the user positioned at the front of the head mounted display device 10 can check the digital information 32, which is not reversed or not rotated, with a vision.

Figure 4:
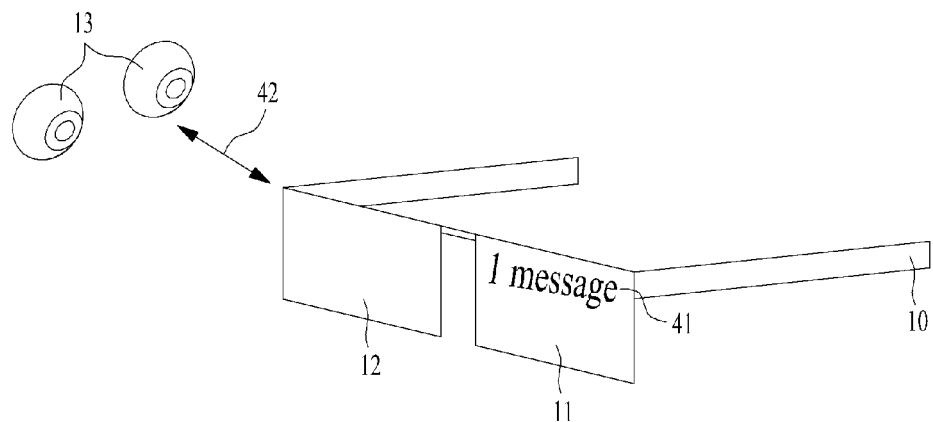
FIG. 4 is a diagram of a non-wearing mode of a head mounted display device according to a different embodiment of the present specification.
Figure 4:
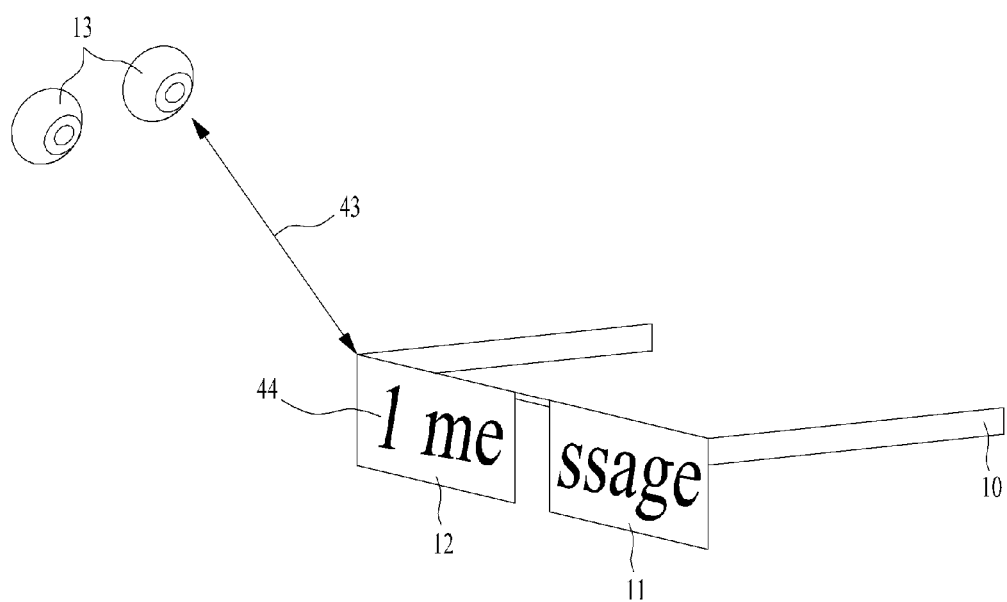

FIG. 4 is a diagram of a non-wearing mode of a head mounted display device according to a different embodiment of the present specification. A user taken off the head mounted display device can gaze at the display unit of the head mounted display device, which is in a non-wearing mode. The head mounted display device 10 detects a distance from a user and can control a magnification attribute of a second user interface format according to the distance between the head mounted display device and the user.

As depicted in the top of FIG. 4, the head mounted display device 10 can display digital information 41 in the display unit 11 with the second user interface format in the non-wearing mode. The head mounted display device 10 can set the magnification attribute of the second user interface format based on the distance from the user. If the distance from the user corresponds to a first distance 42, the head mounted display device 10 can set the magnification attribute as a first magnification.

In this case, the first magnification can be set as a value higher than a second magnification threshold and the second magnification threshold can be defined as the magnification capable of recognizing the digital information 31 by eyes 13 of a user positioned at a point apart from the head mounted display device 10 more than a predetermined distance. By doing so, the user can check the digital information 31 displayed in the display unit 11 in a manner of being expanded by a vision even in the state that the user does not wear the head mounted display device 10.

And, the head mounted display device 10 can set the character attribute of the second user interface format based on the distance from the user. If the distance from the user corresponds to the first distance 42, the head mounted display device 10 can set the character attribute as a first size. In this case, the first size can be set as a value bigger than a second size threshold and the second size threshold can be defined as a size capable of recognizing the content 41 by the eyes 13 of the user positioned at a point apart from the head mounted display device 10 more than a predetermined distance. In particular, the size of the characters included in the digital information can be expanded to the first size.

As depicted in the bottom of FIG. 4, if the distance between the head mounted display device 10 and the user increases from the first distance 42 to a second distance 43, the head mounted display device 10 can measure the distance from the user again. As depicted in the bottom of FIG. 4, the head mounted display device 10 can display digital information 44 with the second user interface format in the non-wearing mode. The head mounted display device 10 can control the magnification attribute of the second user interface format based on the second distance 43, which is the distance from the user. If the distance from the user corresponds to the second distance 43, the head mounted display device 10 can set the magnification attribute as a second magnification. The digital information 44 expanded to the second magnification can be displayed using two display units 11/12 included in the head mounted display device 10.

In this case, the second magnification can be set as a value higher than the first magnification. By doing this, the user can check the digital information 44 displayed in the display units 11/12 in a manner of being expanded by a vision at long range.

And, the head mounted display device 10 can set the character attribute of the second user interface format based on the distance from the user. If the distance from the user increases from the first distance to the second distance, the head mounted display device 10 can set the character attribute as a second size. In this case, the second size can be set as a value bigger than the first size. By doing this, the user can check the digital information 44 by a vision at long range via the characters expanded to the second size although the distance from the head mounted display device has increased.

If the distance to the user is longer than the first distance threshold or if the user is not detected, the head mounted display device 10 can convert the head mounted display device into a power saving mode. The head mounted display device 10 converts the display unit into a standby mode and can stop displaying the digital information. In this case, the first distance threshold can be determined according to information of eyesight of the user.

Figure 5:
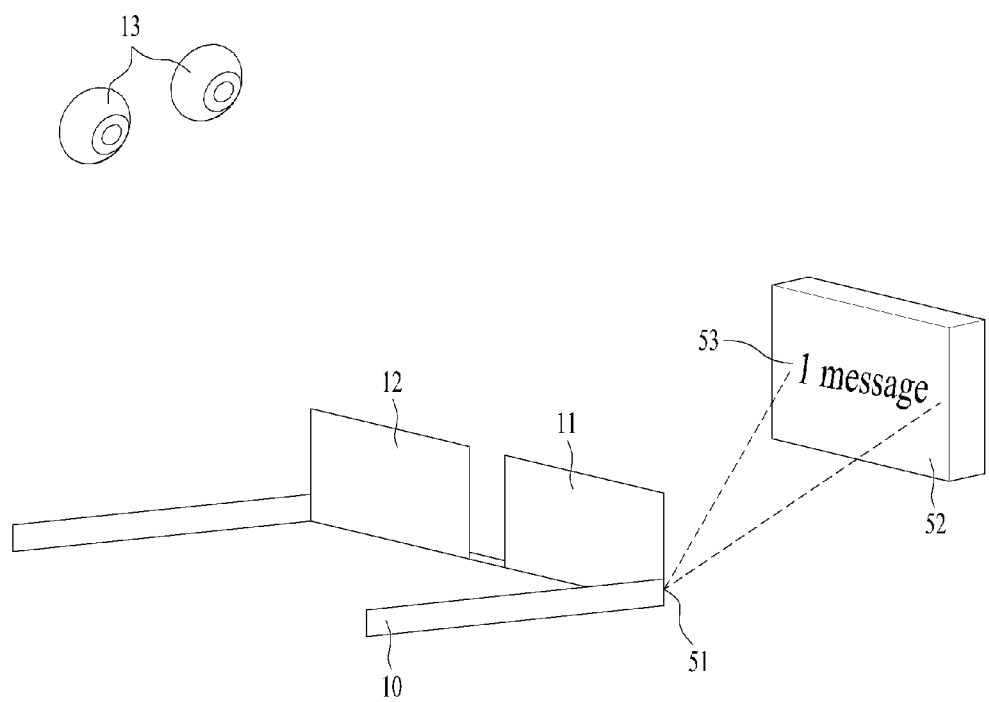
FIG. 5 is a diagram of a non-wearing mode of a head mounted display device according to a different embodiment of the present specification.

FIG. 5 is a diagram of a non-wearing mode of a head mounted display device according to a different embodiment of the present specification. The head mounted display device 10 can include a projector. The head mounted display device 10 can project the digital information to an external object with the second user interface format in the non-wearing mode. The user can check the digital information projected in the external object by a vision.

The head mounted display device 10 can project the digital information 53 in the external object 52 with the second user interface format using the projector 51 in the non-wearing mode. The external object 52 may include a floor or a neighboring object on which the head mounted display device is put. If there is a plurality of external objects, the head mounted display device 10 can further detect the distance to each of the external objects. The head mounted display device can selectively project the digital information to the external objects positioned at a point having a distance from the head mounted display device longer than a second distance threshold among a plurality of the objects. In this case, the second distance threshold can be defined as a minimum distance capable of projecting the digital information with a magnification higher than the second magnification threshold of the second user interface format explained in FIG. 2 by the head mounted display device 10.

The head mounted display device 10 can control brightness of the projector 51. In case of projecting the digital information with the first user interface format in the wearing mode, the head mounted display device 10 can project the digital information with first brightness. In case of projecting the digital information with the second user interface format in the non-wearing mode, the head mounted display device 10 can project the digital information with second brightness, which is brighter than the first brightness. And, the head mounted display device 10 can increase the brightness in proportion to the distance to an external object to which the digital information is projected.

The head mounted display device 10 can set the magnification attribute of the second user interface format with a value higher than the second magnification threshold. In this case, the second magnification threshold can be set as a magnification capable of recognizing the digital information by the eyes 13 of the user positioned at a point apart from the head mounted display device 10 more than a predetermined distance. The second magnification threshold can be determined according to information of eyesight of the user. In particular, the head mounted display device 10 can project the digital information, which was displayed with the first user interface format in the wearing mode, in a manner of expanding the digital information with the second user interface format in the non-wearing mode. By doing this, the user can check the expanded digital information projected in the external object 52 by a vision in the non-wearing mode as well.

And, the head mounted display device 10 can set the character attribute of the second user interface format as a value bigger than the second size threshold capable of being recognized by the eyes 13 of the user positioned at a point apart from the head mounted display device 10 more than a predetermined distance. In particular, the size of the characters included in the digital information can be expanded to a value bigger than the second size threshold.

And, in order for the eyes 13 of the user positioned at a point apart from the head mounted display device more than a predetermined distance to easily recognize, the head mounted display device 10 can set a font of high visibility as the character attribute of the second user interface format. The head mounted display device 10 can set a simple version as the form attribute of the second user interface format. The simple version can include a part of the elements selected according to a priority among the elements included in the digital information as an object to be displayed. In this case, the priority can be determined according to the importance or the urgency of the element included in the digital information.

The head mounted display device 10 in the non-wearing mode can detect a state on which the head mounted display device is put. According to the state on which the head mounted display device is put, the head mounted display device 10 can determine the reversal attribute of the second user interface format. If the head mounted display device 10 is put without being upside down, the head mounted display device 10 can set the reversal attribute of the second user interface format not to be reversed in top-bottom and left-right.

If the head mounted display device 10 is in an upside down position, the head mounted display device 10 can set the reversal attribute of the second user interface format as a top-bottom and a left-right reversal. And, the head mounted display device 10 can apply the rotation attribute rotating as much as 180 degrees to the second user interface format instead of the reversal attribute of the second user interface format according to embodiment.

Figure 6:
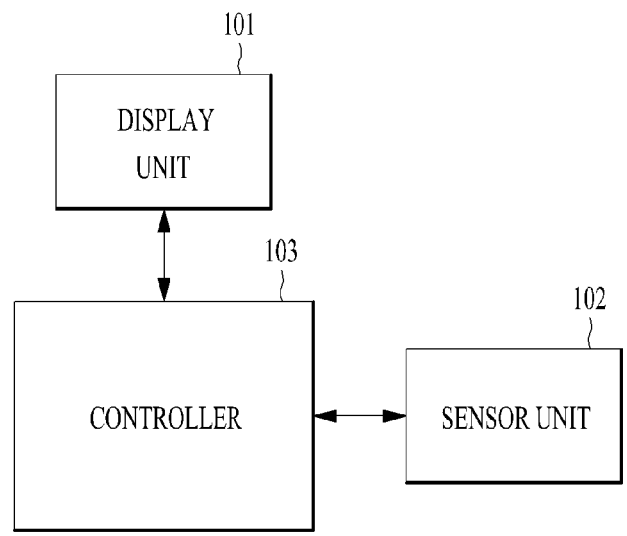
FIG. 6 is a block diagram of a head mounted display device according to one embodiment of the present specification.

FIG. 6 is a block diagram of a head mounted display device according to one embodiment of the present specification. The head mounted display device can include a display unit 101, a sensor unit 102, and a controller 103.

The display unit 101 can display digital information in response to a user interface format. The display unit 101 can display single digital information with a plurality of user interface formats. The display unit 101 can include a first display unit and a second display unit corresponding to a left eye and a right eye of a user, respectively. And, the display unit may further include a projector.

The display unit 101 can include at least one selected from the group consisting of an Organic Light-Emitting Diode (OLED), a Liquid Crystal Display (LCD), an E-ink, a projector, and a flexible display according to embodiment.

The sensor unit 102 can detect whether a user wears a head mounted display device. The sensor unit 102 can detect whether a user wears the head mounted display device using a sensor installed in a bridge part of the center of the head mounted display device or a sensor installed in a temple part corresponding to both legs. The sensor unit 102 can detect whether a user wears the head mounted display device using at least one selected from the group consisting of a contact sensor, a touch sensor and a proximity sensor.

The sensor unit 102 can detect a state on which the head mounted display device is put. The sensor unit 102 can detect whether the head mounted display device is in an upside down position or not using an image sensor, a gravity sensor, or the proximity sensor.

The sensor unit 102 can measure a distance between the head mounted display device and a user. The sensor unit 102 detects the user using the image sensor and a distance sensor and can measure the distance between the head mounted display device and the user. The sensor unit 102 can deliver at least one of detected information on whether a user wears the head mounted display device, the information on the state on which the head mounted display device is put, and the information on a position of the user to the controller.

The controller 103 can control the sensor unit 102 and the display unit 103 using the information delivered from the sensor unit 102. The controller 103 can receive the information on whether a user wears the head mounted display device. If the head mounted display device is in a wearing mode, the controller 103 can display the digital information with the first user interface format as mentioned in FIG. 1. If the head mounted display device is in a non-wearing mode, the controller 103 can display the digital information with the second user interface format as described in FIG. 2 to FIG. 5.

The second user interface format can include an attribute enhancing visibility compared to the first user interface format in order for a user positioned at a point more than a predetermined distance to recognize digital information. Hence, the second user interface format may have a higher magnification attribute and a bigger character attribute compared to the first user interface format. And, the font included in the character attribute of the second user interface format may have a font of high visibility and the second user interface format may have a simple version with regard to the form attribute. The simple version can include a part of the elements selected according to a priority among the elements included in the digital information as an object to be displayed. In this case, the priority can be determined according to the importance or the urgency of the element included in the digital information.

The controller 103 can receive the information on the state on which the head mounted display device is put from the sensor unit 102. The controller 103 can determine whether a top-bottom reversal included in the reversal attribute of the second user interface format is performed according to the state on which the head mounted display device is put. If the head mounted display device is in the state of being upside down, the controller can set the reversal attribute of the second user interface as a top-bottom reversal.

The controller 103 can receive information on a position of a user. The controller 103 can determine whether a left-right reversal included in the reversal attribute of the second user interface format is performed according to the position of the user for the head mounted display device.

If the head mounted display device is positioned at the front of the head mounted display device, the controller 103 can set the reversal attribute of the second interface format as the left-right reversal. If the user is positioned at the front of the head mounted display device in the state that the head mounted display device is upside down, the controller 103 can set the reversal attribute of the second user interface format not to be reversed in left-right.

If the user is positioned at the back of the head mounted display device, the controller 103 can set the reversal attribute of the second user interface format not to be reversed in left-right. If the user is positioned at the back of the head mounted display device in the state that the head mounted display device is upside down, the controller 103 can set the reversal attribute of the second user interface format as the left-right reversal.

The controller 103 receives the information on the position of the user from the sensor unit 102 and can control the magnification attribute of the second user interface format according to the distance between the head mounted display device and the user. The controller 103 can increase the magnification attribute of the second user interface format in proportion to the distance to the user. Hence, the user can check digital information, which is expanding as the distance between the head mounted display device and the user increases, by a vision.

The display unit 101 can include a first display unit and a second display unit corresponding to a left eye and a right eye of the user, respectively. As the magnification attribute increases, the controller 103 can display the digital information, which was displayed in the first display unit, in the first and the second display unit in a manner of expanding the digital information.

FIG. 6 is a block diagram according to one embodiment. Blocks represented as being separated are depicted for elements of the head mounted display device in a manner of being logically distinguished. Thus, the aforementioned elements of the head mounted display device may be equipped with a single chip or a plurality of chips according to a design of the head mounted display device.

Figure 7:
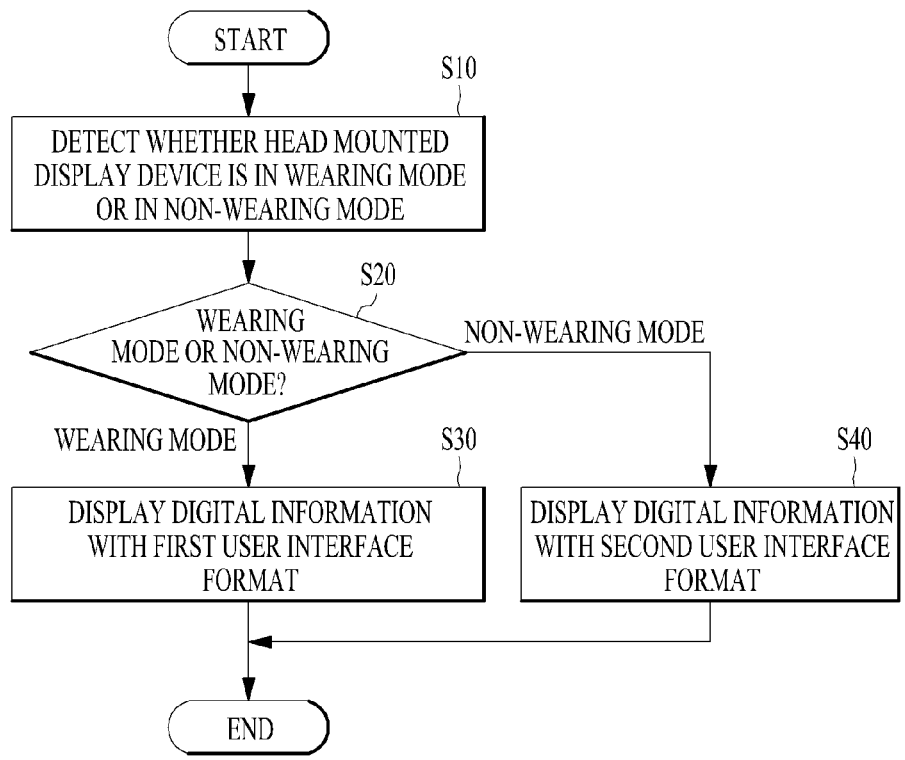
FIG. 7 is a flowchart of a method of controlling a head mounted display device according to one embodiment of the present specification.

FIG. 7 is a flowchart of a method of controlling a head mounted display device according to one embodiment of the present specification. The head mounted display device can detect whether a user wears the head mounted display device [S10]. As mentioned earlier in FIG. 6, the head mounted display device can detect a wearing mode using the sensor unit. The head mounted display device can detect whether the user wears the head mounted display device using the sensor unit installed in a bridge part of the center of the head mounted display device or the sensor unit installed in a temple part corresponding to both legs. The head mounted display device can detect the wearing mode using at least one selected from the group consisting of a contact sensor, a touch sensor, and a proximity sensor. The head mounted display device can deliver the information on the wearing mode detected by the sensor unit to the controller.

The head mounted display device can determine whether the user wears the head mounted display device [S20]. As mentioned earlier in FIG. 6, the head mounted display device can determine whether the user wears the head mounted display device based on the information on the wearing mode, which is delivered from the sensor unit using the controller.

In case of the wearing mode, the head mounted display device can display digital information with the first user interface format [S30]. As mentioned earlier in FIG. 1, the head mounted display device can display the digital information with the first user interface format in the wearing mode.

A highest magnification of the digital information capable of being recognized by the user wearing the head mounted display device can be defined as a first magnification threshold. The head mounted display device can set a value lower than the first magnification threshold capable of being recognized by a neighboring user as the magnification attribute of the first user interface format.

And, a maximum size of a character capable of being recognized by the user wearing the head mounted display device can be defined as a first size threshold. The head mounted display device can set a value smaller than the first size threshold as the character attribute of the first user interface format. In particular, a size of the characters included in the digital information can be set with a value smaller than the first size threshold. And, the head mounted display device can set a font capable of being easily recognized by the user wearing the head mounted display device as the character attribute of the first user interface format. And, the head mounted display device can set a detail version of the digital information as the form attribute of the first user interface format. The detail version can include all elements included in the digital information as an object to be displayed. The head mounted display device can display the digital information according to each of the attributes of the first user interface format.

In case of the non-wearing mode, the head mounted display device can display the digital information with a second user interface format [S40]. As mentioned earlier in FIG. 2, the head mounted display device can display the digital information with the second user interface format in the wearing mode. A lowest magnification of the digital information capable of being recognized by the user not wearing the head mounted display device can be defined as a second magnification threshold. The head mounted display device can set a value higher than the second magnification threshold as the magnification attribute of the second user interface format. The second magnification threshold can be determined according to information of eyesight of the user. By doing so, the user can check the digital information displayed in the display unit in a manner of being expanded by a vision even in the state that the user does not wear the head mounted display device.

And, a minimum size of a character capable of being recognized by the user not wearing the head mounted display device can be defined as a second size threshold. The head mounted display device can set a value bigger than the second size threshold, which is capable of being recognized by the user positioned at a point apart from the head mounted display device more than a predetermined distance and not wearing the head mounted display device, as the character attribute of the second user interface format. In particular, the head mounted display device can expand the size of the characters included in the digital information to a value bigger than the second size threshold. And, the head mounted display device can set a font of high visibility as the character attribute of the second user interface format for the user not wearing the head mounted display device and positioned at a point apart from the head mounted display device more than a predetermined distance to easily recognize the digital information. The head mounted display device can set a simple version of the digital information as the form attribute of the second user interface format. The simple version can include a part of the elements selected according to a priority among the elements included in the digital information as an object to be displayed. In this case, the priority can be determined according to the importance or the urgency of the element included in the digital information. The head mounted display device can display the digital information according to each of the attributes of the second user interface format.

In case of converting from the wearing mode to the non-wearing mode, the head mounted display device can display the digital information, which was displayed with the first user interface format, with the second user interface format in a manner of expanding. The head mounted display device can display the digital information in a manner of gradually changing from the first user interface format to the second user interface format. The head mounted display device can further detect the distance between the head mounted display device and the user using the sensor unit. The head mounted display device can control a speed of which the first user interface format changes to the second user interface format in response to a speed of which the distance to the user is modified.

FIG. 8 is a flowchart of a method of determining a reversal attribute of a second user interface format according to one embodiment of the present specification. The head mounted display device can detect a state on which the head mounted display device is put [S110]. The head mounted display device can be put on a desk, a floor, or the like in the non-wearing mode. As mentioned earlier in FIG. 6, the head mounted display device in the non-wearing mode can detect the state on which the head mounted display device is put using the sensor unit. The head mounted display device can detect whether the head mounted display device is in an upside down position or not using an image sensor, a gravity sensor, or a proximity sensor.

The head mounted display device can determine whether the head mounted display device is in an upside down position [S120]. As mentioned earlier in FIG. 2 and FIG. 3, the head mounted display device can determine whether the head mounted display device is upside down or not based on a result detected by the sensor unit.

In case of being put in upside down, the head mounted display device can set the reversal attribute of the second user interface format as a top-bottom reversal [S130]. As mentioned earlier in FIG. 2 and FIG. 3, the head mounted display device can add the top-bottom reversal to the reversal attribute of the second user interface format in the state of being upside down. In order to determine whether a left-right reversal is additionally added to the reversal attribute, which is set as the top-bottom reversal, the head mounted display device can detect a position of a user in the following step.

The head mounted display device can detect the position of the user [S140]. As mentioned earlier in FIG. 2 and FIG. 3, the head mounted display device can detect the position of the user using an image sensor. In detecting the position of the user, the head mounted display device can detect whether the user is positioned at the front of the head mounted display device or the back of the head mounted display device.

The head mounted display device can determine whether the position of the user is the front of the head mounted display device or the back of the head mounted display device [S150]. As mentioned in FIG. 3, if the user is positioned at the front of the head mounted display device, the head mounted display device can stop the setting for the second user interface format without an additional setting for the reversal attribute of the second user interface format. In particular, the head mounted display device can finish the setting of the reversal attribute of the second user interface format with the top-bottom reversal only. Hence, if the digital information is displayed with the second user interface format, an image reversed in top-bottom can be displayed.

If the user is positioned at the back of the head mounted display device, the head mounted display device can further consider a left-right reversal for the reversal attribute in the following step.

If the user is positioned at the back of the head mounted display device, the head mounted display device can add the left-right reversal to the reversal attribute [S180]. As mentioned earlier in FIG. 2, if the position of the user is determined as the back of the head mounted display device in the state that the head mounted display device is upside down, the head mounted display device can additionally set the left-right reversal to the reversal attribute of the second user interface format. Hence, if the digital information is displayed by the second user interface format, an image reversed in left-right and top-bottom can be displayed.

In the step S120, if it is judged that the head mounted display device is put without being upside down, the head mounted display device does not set the top-bottom reversal to the reversal attribute of the second user interface format. In order to determine whether the left-right reversal is set to the reversal attribute, the head mounted display device can detect the position of the user in the following step.

The head mounted display device can detect the position of the user [S160]. The head mounted display device can detect the position of the user using an image sensor. In detecting the position of the user, the head mounted display device can detect whether the user is positioned at the front of the head mounted display device or the back of the head mounted display device.

The head mounted display device can detect whether the position of the user is the front of the head mounted display device or the back of the head mounted display device [S170]. As mentioned earlier in FIG. 2, if the user is positioned at the back of the head mounted display device, the head mounted display device can stop the setting for the second user interface format without an additional setting for the reversal attribute of the second user interface format. In particular, the head mounted display device can finish the setting for the second user interface format without the setting for the reversal attribute of the second user interface format. Hence, if the digital information is displayed by the second user interface format, an image not reversed in top-bottom or left-right can be displayed.

If the user is positioned at the front of the head mounted display device, the head mounted display device can add the left-right reversal to the reversal attribute [S180]. As mentioned earlier in FIG. 3, if the position of the user is determined as the front of the head mounted display device in the state that the head mounted display device is not upside down, the head mounted display device can additionally set the left-right reversal to the reversal attribute of the second user interface format. Hence, if the digital information is displayed by the second user interface format, an image reversed in left-right can be displayed.

The head mounted display device can display the digital information according to whether the left-right reversal and the top-bottom reversal set by the reversal attribute of the second user interface format are performed.

As mentioned in the foregoing description, the head mounted display device of the present specification can provide visual information to the user in the state of being not worn as well as the wearing mode in a manner of adaptively changing a format of the digital information according to whether the user wears the head mounted display device and according to the position of the user.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A head mounted display (HMD) device, comprising:
   a display unit configured to display digital information according to a user interface format;
   a sensor unit configured to detect whether the HMD device is in a wearing mode or a non-wearing mode; and
   a controller configured to:
   display the digital information with a first user interface format in the wearing mode, and
   display the digital information with a second user interface format in the non-wearing mode,
   wherein the second user interface format comprises a reversal attribute of the digital information, and
   wherein the reversal attribute includes at least one of a left-right reverse or a top-bottom reverse.

2. The HMD device of claim 1, wherein the user interface format comprises at least one of a magnification attribute, a character attribute, and a form attribute of the digital information.

3. The HMD device of claim 1, wherein a value of a magnification attribute of the second user interface format is higher than a value of the magnification attribute of the first user interface format.

4. The HMD device of claim 1, wherein the digital information displayed with the second user interface format corresponds to the digital information displayed in a manner of expanding the digital information with the first user interface format.

5. The HMD device of claim 1, wherein if the HMD device is in the non-wearing mode, the sensor unit is further configured to detect a position of a user,
   wherein if the position of the user is in front of the HMD device, the digital information displayed with the second user interface format corresponds to the digital information displayed in a manner of expanding the digital information with the first user interface format and reversing a left-right of the digital information with the first user interface format, and
   wherein if the position of the user is in back of the HMD device, the digital information displayed with the second user interface format corresponds to the digital information displayed in a manner of expanding the digital information with the first user interface format and not reversing the left-right of the digital information with the first user interface format.

6. The HMD device of claim 1, wherein if the head mounted display device is in the non-wearing mode, the sensor unit is further configured to detect whether the HMD is placed in an upside down position, and
   wherein if the HMD device is in the upside down position, the digital information displayed with the second user interface format corresponds to the digital information displayed in a manner of expanding the digital information with the first user interface format and reversing a top-bottom of the digital information with the first user interface format.

7. The HMD device of claim 1, wherein if the head mounted display device is in the non-wearing mode, the sensor unit is further configured to detect a position of a user with respect to the HMD and to detect whether the HMD is placed in an upside down position,
   wherein if the HMD device is in the upside down position and the position of the user is in back of the HMD device, the digital information displayed with the second user interface format corresponds to the digital information displayed in a manner of expanding the digital information with the first user interface format and reversing a top-bottom and a left-right of the digital information with the first user interface format, and
   wherein if the HMD device is in the upside down position and the position of the user is in front of the head mounted display device, the digital information displayed with the second user interface format corresponds to the digital information displayed in a manner of expanding the digital information with the first user interface format, reversing the top-bottom of the digital information with the first user interface format, and not reversing the left-right of the digital information with the first user interface format.

8. The HMD device of claim 7, wherein the sensor unit is configured to detect the position of the HMD device is using at least one of a gravity sensor, an image sensor, and proximity sensor.

9. The HMD device of claim 1, wherein if the HMD device is in the non-wearing mode, the sensor unit is further configured to detect a distance from the HMD device to a user and the controller is configured to increase a magnification attribute of the digital information displayed with the second user interface format in proportion to the detected distance.

10. The HMD device of claim 1, wherein if the HMD device is in the non-wearing mode, the sensor unit is further configured to detect a distance from the HMD device to a user and wherein if the distance to the user is longer than a first distance threshold or if the user is not detected, the controller is configured to convert the head mounted display device into a power saving mode.

11. The HMD device of claim 10, wherein the first distance threshold is determined according to information of eyesight of the user.

12. The HMD device of claim 1, further comprising a projector configured to project the digital information.

13. The HMD device of claim 12, wherein the controller is configured to increase brightness of the projector in case of displaying the digital information with the second user interface format compared to the brightness of the projector in case of displaying the digital information with the first user interface format.

14. The HMD device of claim 12, wherein the sensor unit is further configured to detect an external object and wherein the controller is configured to project the digital information to the detected external object.

15. The HMD device of claim 14, wherein if there exists a plurality of external objects, the sensor unit is further configured to detect each distance to a plurality of the external objects and wherein the controller is configured to project the digital information to the external object located at a point more than a distance threshold among a plurality of the external objects.

16. The HMD device of claim 1, wherein the controller is configured to display the digital information in a manner of gradually changing from the first user interface format to the second user interface format while the HMD device is changed from the wearing mode to the non-wearing mode.

17. The HMD device of claim 16, wherein the sensor unit is further configured to detect a distance between the HMD device and a user and wherein the controller is configured to determine a speed of changing the digital information from the first user interface format to the second user interface format in response to a speed of which the distance is modified.

18. The HMD device of claim 1, wherein the controller is configured to display a detail version of the digital information in displaying the digital information with the first user interface format and configured to display a simple version of the digital information in displaying the digital information with the second user interface.

19. The HMD device of claim 18, wherein the detail version comprises all elements of the digital information and wherein the simple version comprises a part of the elements selected from the elements of the digital information.

20. A method of controlling a head mounted display (HMD) device, the method comprising:
   detecting whether the HMD device is in a wearing mode or a non-wearing mode;
   if the HMD device is in the wearing mode, displaying the digital information with a first user interface format; and
   if the head mounted display device is in the non-wearing mode, displaying the digital information with a second user interface format,
   wherein the digital information displayed with the second user interface format corresponds to the digital information displayed in a manner of expanding the digital information displayed with the first user interface format,
   wherein the second user interface format comprises a reversal attribute of the digital information, and
   wherein the reversal attribute includes at least one of a left-right reverse or a top-bottom reverse.

* * * * *